United States Patent
Mezzaro et al.

(10) Patent No.: US 11,542,105 B2
(45) Date of Patent: Jan. 3, 2023

(54) SYSTEM FOR TRANSFERRING ARTICLES FOR PACKAGING MACHINE, PACKAGING MACHINE, CORRESPONDING METHOD AND COMPUTER PROGRAM PRODUCT

(71) Applicant: CT PACK S.R.L., Valsamoggia (IT)

(72) Inventors: Daniele Mezzaro, Ferrara (IT); Fabrizio Pavanelli, Ferrara (IT); Stefano Trivellato, Ferrara (IT)

(73) Assignee: CT PACK S.R.L., Valsamoggia (IT)

( * ) Notice: Subject to any disclaimer, the term of this patent is extended or adjusted under 35 U.S.C. 154(b) by 0 days.

(21) Appl. No.: 17/102,840

(22) Filed: Nov. 24, 2020

(65) Prior Publication Data

US 2021/0163235 A1   Jun. 3, 2021

(30) Foreign Application Priority Data

Nov. 28, 2019 (IT) .................... 102019000022404

(51) Int. Cl.
*B65G 47/90* (2006.01)
*B65G 47/52* (2006.01)

(52) U.S. Cl.
CPC .......... *B65G 47/905* (2013.01); *B65G 47/52* (2013.01); *B65G 47/901* (2013.01); *B65G 2201/0235* (2013.01); *B65G 2203/0233* (2013.01)

(58) Field of Classification Search
CPC ...... B65G 54/02; B65G 47/905; B65G 47/52; B65G 47/901; B65G 47/842; B65G 47/907; B65G 47/91; B65G 47/917; B65G 47/912; B65G 35/16; B65G 35/18; B65G 35/36; B65G 35/38
See application file for complete search history.

(56) References Cited

U.S. PATENT DOCUMENTS 3,577,866 A *  5/1971  Ehrenfried .............. B65B 11/40
                                                           53/557
9,828,192 B2 * 11/2017  Baechle .................. B65B 69/00
                        (Continued)

FOREIGN PATENT DOCUMENTS

| EP | 0856465 A1 | 8/1998 | |
| EP | 2889238 A1 * | 7/2015 | ........... B67C 7/0053 |
| FR | 3075188 A1 | 6/2019 | |

OTHER PUBLICATIONS

Italian Search Report dated Jul. 28, 2020 from counterpart Italian App No. 102019000022404.

*Primary Examiner* — William R Harp
(74) *Attorney, Agent, or Firm* — Shuttleworth & Ingersoll, PLC; Timothy J. Klima

(57) ABSTRACT

A system for transferring articles, includes a plurality of gripping devices, configured to grip respective articles which pass along a first conveyor, wherein each gripping device is movable independently from the remaining gripping devices. A control unit is configured for controlling the gripping devices. A first detection sensor is configured to detect a first value indicating a position of an article on the first conveyor. The control unit is configured for receiving the first value; positioning a gripping device at the article, as a function of the first value; gripping the article with the gripping device; adjusting, as a function of the first value, a speed of the gripping device which grips the article, and releasing the article from the gripping device when the article reaches a release position.

7 Claims, 4 Drawing Sheets

(56) References Cited

U.S. PATENT DOCUMENTS

| | | | | |
|---|---|---|---|---|
| 9,834,392 B2* | 12/2017 | Raffaini | ............... | B65G 47/082 |
| 10,086,510 B1* | 10/2018 | McAninch | ........... | B25J 15/0052 |
| 11,001,400 B2* | 5/2021 | Kalany | ................... | B65B 21/20 |
| 11,186,443 B2* | 11/2021 | Boarin | ................... | B65G 54/02 |
| 11,279,511 B2* | 3/2022 | Marcantoni | ............ | B65G 54/02 |
| 2019/0255698 A1* | 8/2019 | Zein | ........................... | B25J 5/02 |

* cited by examiner

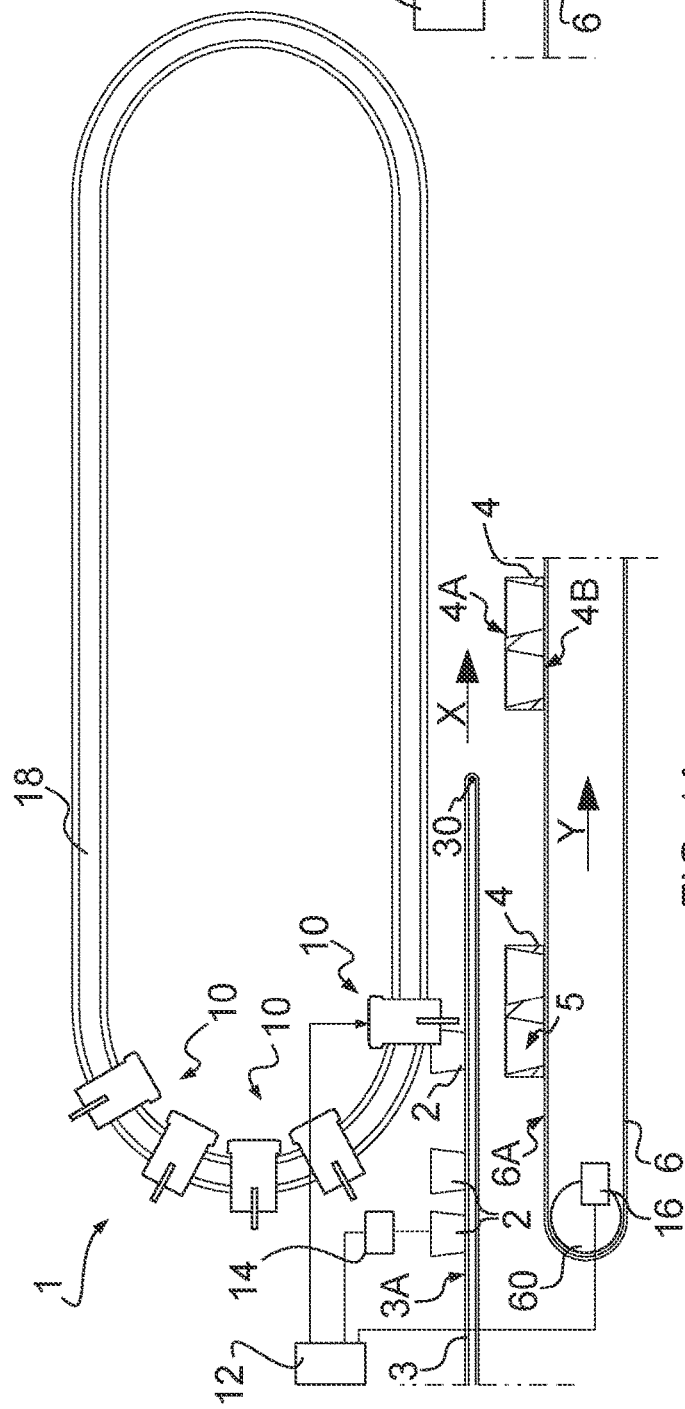

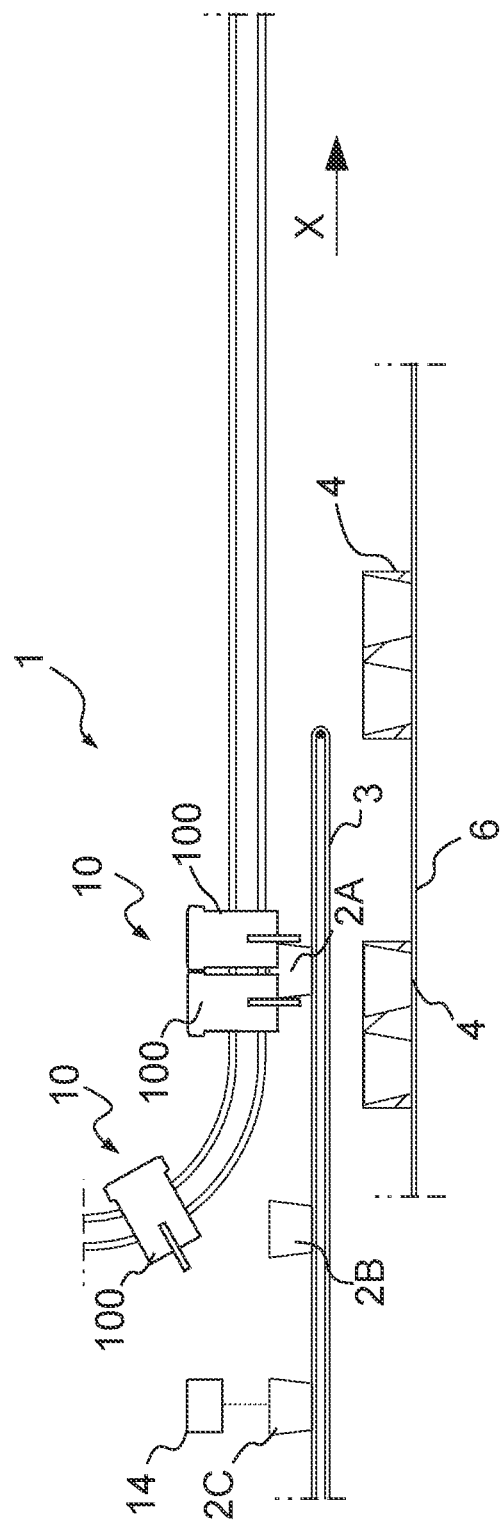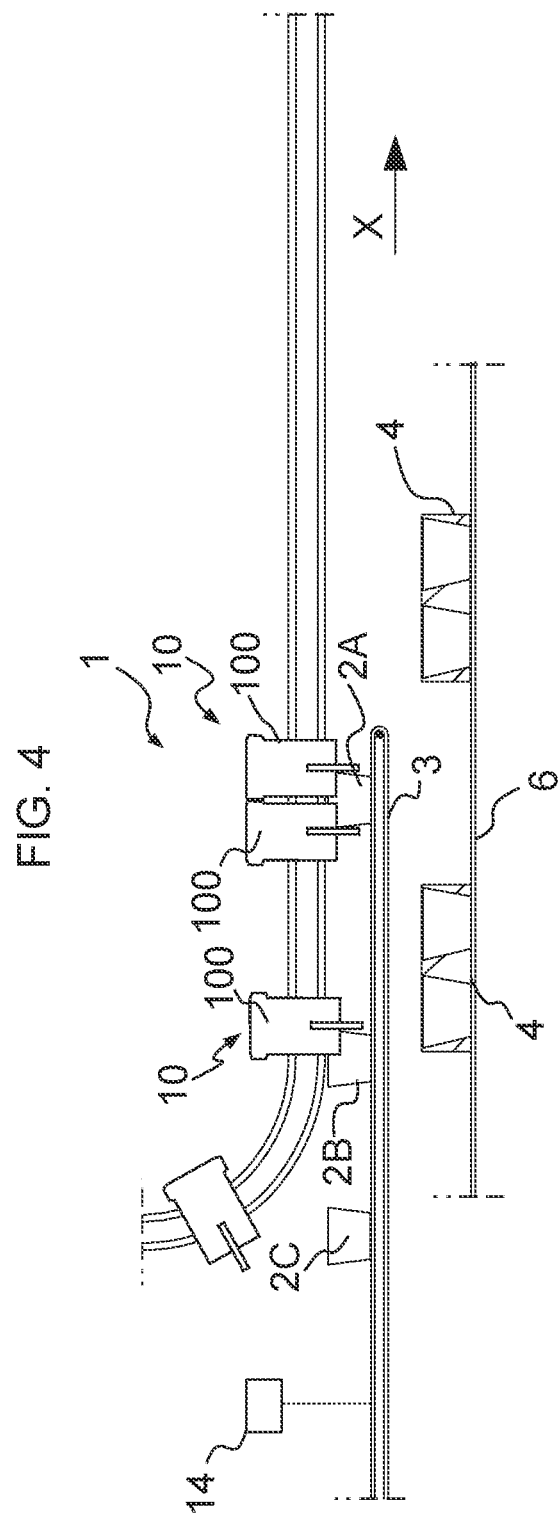

SYSTEM FOR TRANSFERRING ARTICLES FOR PACKAGING MACHINE, PACKAGING MACHINE, CORRESPONDING METHOD AND COMPUTER PROGRAM PRODUCT

This application claims priority to Italian Patent Application 102019000022404 filed Nov. 28, 2019, the entirety of which is incorporated by reference herein.

BACKGROUND OF THE INVENTION

This invention relates to a system for transferring articles, for example food products. The invention also relates to a packaging machine comprising a system for picking up and boxing articles, for example of the flow-pack type.

SUMMARY OF THE INVENTION

According to prior art packaging machines, upstream of the boxing system there is a timing system which prepares the articles to be packaged at a fixed and predetermined distance from each other. The boxing system therefore comprises gripping means configured for picking up the articles which are positioned in predetermined pick-up zones. If the articles are not located in the pick-up zones and are not correctly times, the gripping means are not able to pick up the articles and therefore box them correctly.

The prior art therefore has one or more drawbacks, including the fact that an accurate timing of the articles is necessary on the conveyor lines upstream of the picking up system; moreover, any movement of the articles, especially if they are of the unstable type (for example in the case of frustoconical-shaped articles such as cups), may lead to boxing errors.

An aim of the invention is therefore to provide a system for transferring articles which is not necessarily linked to preparing the articles on the conveyor upstream of the system.

A further aim of the invention is to provide a system for transferring articles which is able to adapt to a non-orderly position of the articles to be boxed.

A further aim of the invention is to provide a system for transferring articles which is able to pick up and box articles in an efficient manner regardless of their shape.

BRIEF DESCRIPTION OF THE DRAWINGS

The technical characteristics of the invention, with reference to the above aims, are clearly described in the claims below and its advantages are apparent from the detailed description which follows, with reference to the accompanying drawings which illustrate a preferred embodiments of the invention provided merely by way of example without restricting the scope of the inventive concept, and in which:

FIGS. 1A and 1B show schematic examples of a packaging machine comprising a system for transferring articles and a packaging device according to one or more embodiments, FIG. 2 shows a schematic detail of a system for transferring articles according to one or more embodiments, FIG. 3 shows a schematic detail of a system for transferring articles according to one or more embodiments, and FIGS. 4 to 8 are examples of the operation of a system for transferring articles according to one or more embodiments.

DESCRIPTION OF THE PREFERRED EMBODIMENTS

Figure 6:
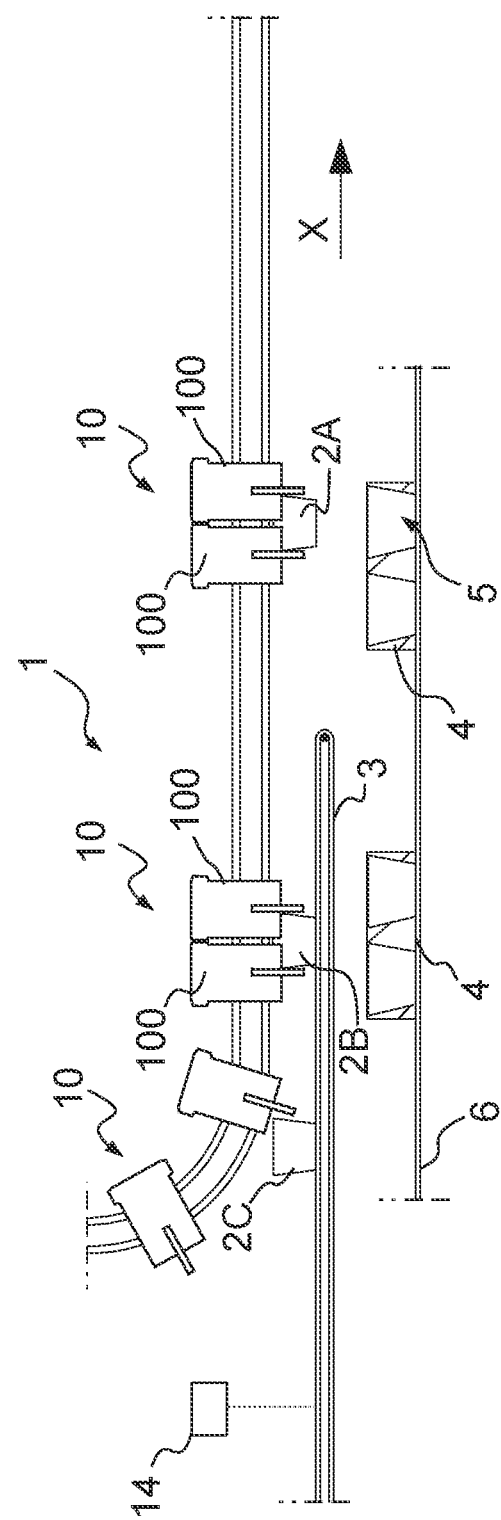

FIG. 1 shows a system 1 for transferring articles 2 according to one or more embodiments, configured for picking up the articles 2 which pass along a first conveyor 3 and boxing them inside packages 4 which pass along a second conveyor 6. The packages 4 comprise seats 5 for receiving respective articles 2.

The first conveyor 3 is configured to transport the articles 2 in a first longitudinal direction X, the articles 2 being positioned in random positions on the conveyor 3. As illustrated in the drawings, the first conveyor 3 may comprise a conveyor belt of the loop type closed around a first wheel 30 and a second wheel (not illustrated in FIG. 1), located at opposite ends of the closed loop, with the conveyor 3 driven by respective drive means.

The second conveyor 6 is configured to transport the packages 4 in a second longitudinal direction Y, which may coincide with the first direction X. The packages 4 are located at predetermined positions on the conveyor 6, for example there may be a constant spacing between one package 4 and the next. The second conveyor 6 may comprise a conveyor belt of the type closed in a loop around a first wheel 60 and a second wheel (not illustrated in FIG. 1), located at opposite ends of the closed loop, with the conveyor 6 driven by respective drive means. The first and second conveyors 3, 6 may move at constant speeds, for example different to each other.

As illustrated in FIG. 1, the first conveyor 3 may be between the system 1 and the second conveyor 6. The articles 2 may be on a surface 3A of the first conveyor 3 facing towards the system 1. The packages 4 may be on a surface 6A of the second conveyor 6 facing the system 1.

The transfer system 1 comprises a plurality of gripping devices 10, configured to grip (for example, retain and/or lift) the articles 2 from the first conveyor 2 and release the articles 2 when they reach release positions, for example when the articles 2 are at the respective seats 5 of the packages 4. The gripping devices 10 are configured for transferring the articles 2 from the first conveyor 3 to the respective packages 4 on the second conveyor 6.

Each gripping device 10 is movable independently from the remaining gripping devices 10.

The transfer system 1 also comprises:

a control unit 12, configured for controlling the plurality of gripping devices 10 (for simplicity, an example of connection between the control unit 12 and the gripping device 10 is illustrated by an arrow in FIG. 1), and a first detection sensor 14, coupled to the control unit 12, configured to detect a first value indicating a position of an article 2 on the first conveyor 3.

The first sensor 14 may be a video camera and the first value may comprise an image showing one or more articles 2. The first sensor 14 may comprise a transit sensor and the first value may comprise an instant of detecting the article 2.

The control unit 12 is configured for:

receiving the first value from the first sensor 14 indicating the position of an article 2, positioning a gripping device 10 at said article 2, as a function of the first value, gripping said article 2 by said gripping device 10, adjusting, as a function of the first value, a speed of the gripping device 10 which grips (for example, lifts) the article 2, decelerating or accelerating the gripping device 10, and releasing the article 2 from the gripping device 10 when the article 2 reaches a release position, for example when it is at a seat 5 of a package 4.

The control unit 12 may be configured to modify the speed of the gripping device 10 and release the article 2 from the gripping device 10, only if the article 2 is not in contact with the first conveyor 3, for example when the article 2 is lifted by the first conveyor 3.

According to one or more embodiments, the system 1 may comprise a second detection sensor 16 configured to detect a second value indicating positions of the packages 4 on the second conveyor 6. In this case, the control unit 12, connected (for example, directly) to the second sensor 16, may be configured to adjust the speed of the gripping device 10 which grips (for example, lifts) the article 2 as a function of the first value and the second value.

The second sensor 16 may be located at a wheel of the conveyor 6, for example the first wheel 60. The second sensor 16 may comprise an encoder or angular position transducer configured to detect an angular movement of the first wheel 60, representing the second value indicating the positions of the packages 4. In fact, the angular movement of the first wheel 60 may indicate the movement of the conveyor 6, which in turn is configured to receive in predetermined portions of the packages 4 at constant distances from each other. The second value comprises information on the position, instant by instant, of said portions and therefore indicates the position of the packages 4 on the conveyor 6. As illustrated in the drawings, the portions of the conveyor 6 comprising the packages 4 may be those on the first surface 6A.

According to one or more embodiments, the transfer system 1 may comprise one or more linear motors, defined by the plurality of gripping devices 10 and one or more tracks 18. According to the example of FIG. 1, the linear motor comprises a single track 18, with a closed loop, configured to allow the movement of the plurality of gripping devices 10 along the closed loop path, for example in the first direction X. As is known, linear motors use magnetic fields for moving objects. In this case, the linear motor may be configured to move the gripping devices 10, independently of each other.

The first conveyor 3, the second conveyor 6 and the transfer system 1 illustrated in FIG. 1A may be inside a packaging machine, configured for boxing the articles 2 and packing the packages 4 once filled with the articles 2. The packaging machine may comprise a packaging device 7 as illustrated in FIG. 1B, downstream of the transfer system 1 and configured for covering with a film 8 the packages 4 and the articles 2 received inside the respective seats 5. The packaging device 7 may be of the flow-pack type. Each package 4 may comprise a first surface 4A and a second surface 4B, opposite the first surface 4A. The second surface 4B may be in contact with the second conveyor 6. The first surface 4A may comprise the seats 5 for receiving the articles 2. When the seats 5 are filled, the packaging device 7 can cover the first surface 4A with the film 8.

FIGS. 2 and 3 show examples of gripping devices 10. As illustrated in the example of FIG. 2, each gripping device 10 may comprise a pair of units 100 which comprise respective arms, where the units 100 are movable independently to grip the articles 2 along the track 18. Ends of the arms can together form a seat 102 for receiving the article 2. The receiving seat 102 may have a shape substantially equal to the shape of the articles 2. The ends of the arms may comprise a shape designed to grip the articles 2 on both lateral faces. In this way, each unit 100 is able to grip an article 2 with the unit 100 which precedes it or which follows it relative to the first direction X. Advantageously, this allows a greater flexibility of the system 1.

As illustrated in the example in FIG. 3, each gripping device 10 may comprise at least one unit 100 equipped with a gripper 104 for gripping the articles 2. The gripper 104 comprises two ends configured to move away from and towards each other to grip the article 2 at one or more opposite sides. As illustrated in FIG. 3, the ends of the gripper 106 may have a shape matching the shape of the gripped article 2.

FIGS. 4 to 8 are schematic views of the transfer system 1 and illustrate an operational example of the system 1 for transferring articles 2 according to one or more embodiments. The reference numerals used above with reference to FIGS. 1 to 3 denote the same features, and a detailed description will be omitted for simplicity. The first conveyor 3 is configured for transporting the articles 2 along the first direction X, for example a first, a second and a third article 2A, 2B, 2C which are located in sequence at random distances from each other. Hereinafter, the terms in front and behind an object will be used to refer to elements which precede or follow the object respectively relative to the first direction X.

As illustrated in FIG. 4, the first sensor 14, located at the first conveyor 3, is configured, for each article 2, for detecting the first value indicating a position of the article 2 as the articles 2 pass on the conveyor 3.

As already discussed, the first sensor 14 can send the first value to the control unit 12 for each article 2 detected. The control unit 12 may in turn control the units 100 defining the gripping devices 10 for gripping the articles 2 as a function of the first value.

As shown by way of example in FIG. 4, the first article 2A is gripped by a pair of units 100 positioned in front of and behind the first article 2A.

As shown by way of example in FIG. 5, once the first article 2A has been gripped, the gripping device 10 may be configured to accompany the movement of the article 2A along the first conveyor 3; the gripping device 10 in this case has a speed equal to that of the first conveyor 3.

In addition or alternatively, as illustrated in FIG. 6 with reference to the first article 2A, the gripping device 10 may be configured to keep the articles 2 suspended when they are no longer in contact with the conveyor 3. For example, this may occur when the first conveyor 3 ends or if the gripping device 10 lifts the first article 2A from the first conveyor 3. The articles 2 may be kept suspended at a predetermined height which may coincide with the height of the first conveyor 3 or they may be adjusted according to the position of the conveyor 3 and/or of the packages 4. When the first article 2A is no longer in contact with the first conveyor 3, for example if the conveyor 3 and/or the gripping device 10 has lifted the article 2A, the speed of the gripping device 10 may be different from that of the first conveyor 3.

According to one or more embodiments, the gripping devices 10 can modify the respective speed as a function of the first value. For example, as illustrated in FIGS. 4 and 5, a unit 100, configured to grip the second article 2B, may be accelerated, so as to be positioned in front of the second article 2B. In the same way, a further unit 100 may be accelerated to be positioned behind the second article 2B.

As illustrated in FIG. 6, when the first article 2A is not in contact with the first conveyor 3, the gripping device 10 may transport it towards the release position, which may correspond to a seat 5 of a package 4. The control unit 12 may be configured to adjust the speed of the gripping device 10 which grips the first article 2A as a function of the first value and of the second value. In other words, based on a starting position, calculated as a function of the first value, and a release position, calculated as a function of the second value, the gripping device 10 may be accelerated or decelerated to allow the gripped article 2 to be inserted into the seat 5, for example released at a predetermined release position and at a predetermined instant.

Figure 7:
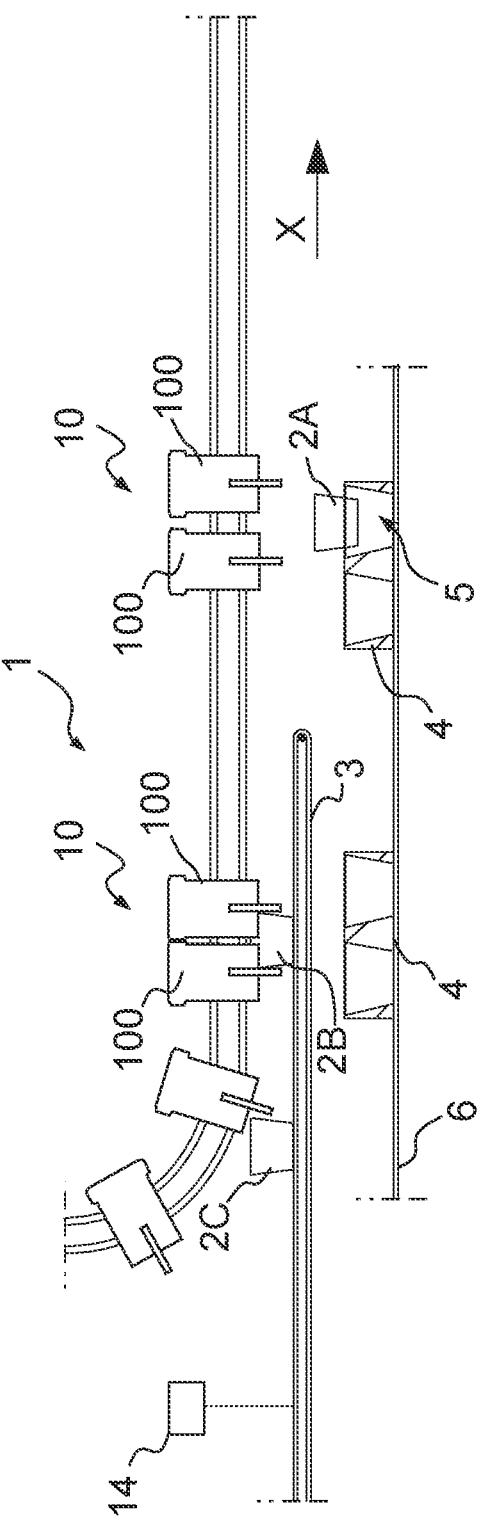

As illustrated in FIG. 7, when the first article 2A reaches the release position, the gripping device 10 can insert the article 2A in the seat 5 accompanying the first article 2A inside the seat 5. The gripping device 10 can release the first article 2A, moving the units 100 of the gripping device 10 away from the first article 2A to widen the receiving seat 102.

According to one or more embodiments, the packages 4 may comprise two or more seats 5. The processing unit 12 may therefore be configured to fill the seats 5 of the packages 4 in succession. Moreover, the processing unit 12 may be configured to fill all the seats 5 of a certain package 4 before filling the next package 4.

As illustrated in the drawings, each package 4 may comprise a first and a second seat 5. The processing unit 12 may be configured for:

checking whether one or more seats 5 of a package 4 are free, gripping an article 2 by a gripping device 10, if a seat 5 is free, positioning the gripping device 10 at the free seat 5, and releasing the article 2 from the gripping device 10.

For example, in order to check whether one or more seats 5 are free, the processing unit 12 may be configured for storing information indicating each time an article 2 is released and inserted in a certain seat 5, and to access that information when it verifies that a seat 5 is free.

Figure 8:
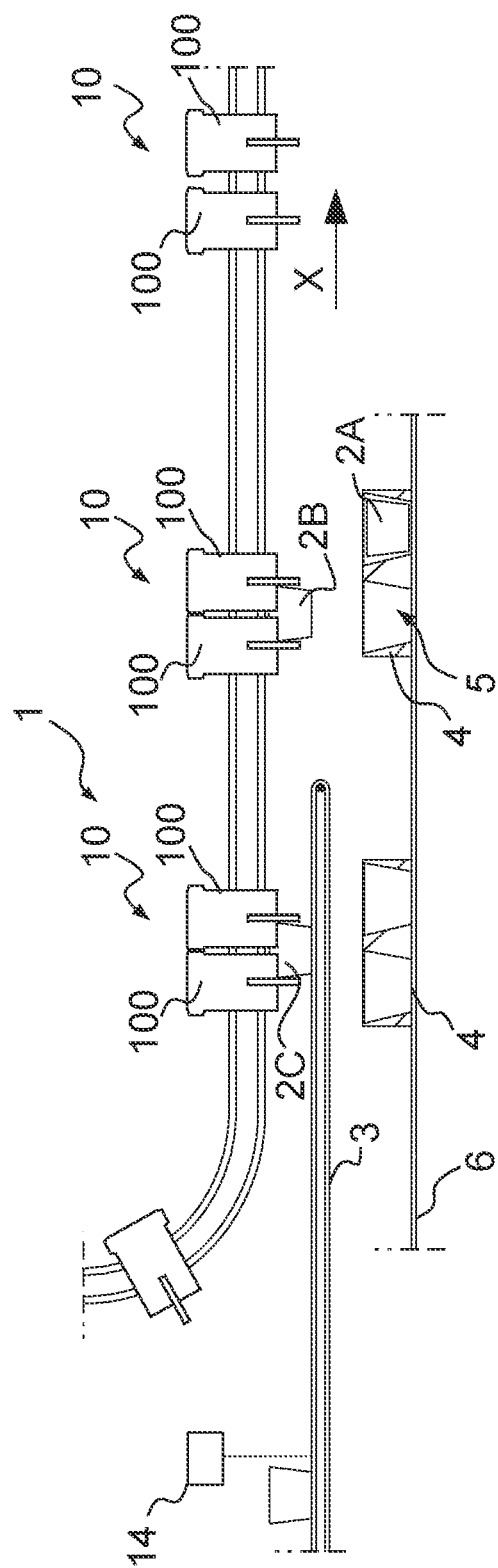

In the example illustrated in FIG. 8, the first article 2A is inside the first seat 5 of the package 4 and the second article 2B is transported to the second empty seat 5 of the package 4.

According to an aspect of the invention, the conveyor 6 may comprise one or more linear motors, defined by positioning elements and one or more tracks, not illustrated in the drawings. The positioning elements can be moved independently and can be configured to position the packages 4 at predetermined positions on the conveyor 6.

According to this aspect, the conveyor 6 may be configured in such a way that the position and the speed of each of the positioning elements can be adjusted independently.

Advantageously, the articles can reach the transfer system according to the invention positioned in a random manner. Therefore, a timing is not necessary upstream of the system.

Moreover, the gripping devices of the system are able to transfer and box articles even with an unstable shape, minimising the risk of errors due to objects not correctly boxed. In particular, the system does not require external devices for stabilising objects.

One or more embodiments may refer to a method for transferring articles, comprising the steps of:

providing a system for transferring articles according to one or more embodiments, detecting a first value indicating a position of an article on the first conveyor, positioning a gripping device at the article, as a function of said first value, gripping said article, adjusting, as a function of the first value, a speed of the gripping device which grips the article, and releasing the article when the article reaches a release position.

The method can also comprise the steps of:

transferring the articles from the first conveyor to respective packages which pass along a second conveyor, detecting a second value indicating the positions of the packages on the second conveyor, and adjusting the speed of the gripping device which grips the article as a function of the first value and the second value.

The invention relates to a computer program product which can be loaded in a memory of at least one processor (for example, the processing unit) and comprising software code portions to perform the steps of the method listed above.

The invention also relates to a method for packaging articles, which may comprise all the steps of the method for transferring the articles listed above and also the steps of:

providing a packaging device, downstream of the transfer system, and covering with a film said packages and said articles received inside the seats.

What is claimed is:

1. A system for transferring articles, comprising:
   a track establishing a single path of movement,
   a first conveyor, movable in a first longitudinal direction, and configured for transporting the articles,
   a second conveyor, movable in a second longitudinal direction, and configured for transporting a plurality of packages having seats for receiving respective ones of the articles,
   a plurality of gripping devices, configured to grip respective articles which pass along the first conveyor, wherein each of the gripping devices is movable independently from the remaining gripping devices along the track,
   wherein the plurality of gripping devices are configured for:
      gripping the articles from the first conveyor;
      transferring the articles from the first conveyor to respective seats of the packages which transit along the second conveyor, and
      releasing the articles when the articles are at the respective seats of the packages,
   a control unit, configured for controlling said gripping devices,
   a first detection sensor, configured to detect a first value indicating a position of one of the articles on the first conveyor,
   a second detection sensor configured for detecting a second value indicating positions of the packages on the second conveyor,
   wherein said control unit is configured for:
      receiving said first value,
      positioning one of the gripping devices at the one of the articles, as a function of said first value,
      gripping said one of the articles with the one of the gripping devices,
      adjusting a speed of the one of the gripping devices which grips the one of the articles by accelerating or decelerating the one of the gripping devices which grips the one of the articles, based on a starting position, calculated as a function of the first value, and a release position, calculated as a function of the second value, to position the one of the articles at the release position at a predetermined instant to insert the one of the articles in a respective one of the seats, and
      releasing the one of the articles from the one of the gripping devices when the one of the articles reaches the release position;

wherein said one of the gripping devices comprises two arms to define together a seat for receiving and gripping the one of the articles, wherein the two arms are movable independently with respect to each other along the single path of movement to vary a distance between the two arms and thereby adjust a dimension of the seat to match a size of the one of the articles.

2. The system according to claim 1, wherein said control unit is configured for modifying the speed of the one of the gripping devices and releasing the one of the articles from the one of the gripping devices, if the one of the articles is not in contact with the first conveyor.

3. The system according to claim 1, and further comprising a linear motor configured for moving the plurality of gripping devices.

4. The system according to claim 1, and further comprising a packaging device, downstream of the system for transferring articles, configured for covering with a film said packages and said articles received inside the respective seats.

5. A method for transferring articles for a system for transferring articles, comprising the steps of:
providing a system for transferring articles, comprising:
a track establishing a single path of movement,
a first conveyor, movable in a first longitudinal direction, and configured for transporting the articles,
a second conveyor, movable in a second longitudinal direction, and configured for transporting a plurality of packages having seats for receiving respective ones of the articles,
a plurality of gripping devices, configured to grip respective articles which pass along the first conveyor, wherein each of the gripping devices is movable independently from the remaining gripping devices along the track,
wherein the plurality of gripping devices are configured for:
gripping the articles from the first conveyor;
transferring the articles from the first conveyor to respective seats of the packages which transit along the second conveyor, and
releasing the articles when the articles are at the respective seats of the packages,
a control unit, configured for controlling said gripping devices,
a first detection sensor, configured to detect a first value indicating a position of one of the articles on the first conveyor,
a second detection sensor configured for detecting a second value indicating positions of the packages on the second conveyor,
wherein said control unit is configured for:
receiving said first value,
positioning one of the gripping devices at the one of the articles, as a function of said first value,
gripping said one of the articles with the one of the gripping devices,
adjusting a speed of the one of the gripping devices which grips the one of the articles by accelerating or decelerating the one of the gripping devices which grips the one of the articles, based on a starting position, calculated as a function of the first value, and a release position, calculated as a function of the second value, to position the one of the articles at the release position at a predetermined instant to insert the one of the articles in a respective one of the seats, and
releasing the one of the articles from the one of the gripping devices when the one of the articles reaches the release position;
wherein said one of the gripping devices comprises two arms to define together a seat for receiving and gripping the one of the articles,
wherein the two arms are movable independently with respect to each other along the single path of movement to vary a distance between the two arms and thereby adjust a dimension of the seat to match a size of the one of the articles,
detecting the first value,
positioning the one of the gripping devices at the one of the articles, as a function of said first value,
gripping said one of the articles,
adjusting, as a function of the first value, the speed of the one of the gripping devices which grips the one of the articles, and
releasing the one of the articles when the one of the articles reaches the release position.

6. The method according to claim 5, and further comprising the steps of:
transferring the respective articles from the first conveyor to respective packages which pass along the second conveyor,
detecting the second value indicating the positions of the packages on the second conveyor, and
adjusting the speed of the one of the gripping devices which grips the one of the articles as a function of the first value and the second value.

7. The method according to claim 6, and further comprising the steps of:
providing a packaging device, downstream of the system for transferring articles, and
covering with a film said packages and said respective articles received inside the seats.

* * * * *